United States Patent
Tolley et al.

(10) Patent No.: US 10,142,275 B2
(45) Date of Patent: Nov. 27, 2018

(54) SYSTEM AND METHOD FOR MANAGING MESSAGES BASED ON USER RANK

(71) Applicants: Dan Tolley, Purcellville, VA (US); Joseph Tolley, Purcellville, VA (US)

(72) Inventors: Dan Tolley, Purcellville, VA (US); Joseph Tolley, Purcellville, VA (US)

(*) Notice: Subject to any disclaimer, the term of this patent is extended or adjusted under 35 U.S.C. 154(b) by 65 days.

(21) Appl. No.: 14/848,322

(22) Filed: Sep. 8, 2015

(65) Prior Publication Data
US 2016/0072757 A1    Mar. 10, 2016

Related U.S. Application Data

(60) Provisional application No. 62/047,780, filed on Sep. 9, 2014.

(51) Int. Cl.
   G06F 15/16    (2006.01)
   H04L 12/58    (2006.01)
   G06Q 10/10    (2012.01)

(52) U.S. Cl.
   CPC .............. *H04L 51/26* (2013.01); *G06Q 10/10* (2013.01); *G06Q 10/109* (2013.01); *H04L 51/14* (2013.01)

(58) Field of Classification Search
   CPC ......... H04L 51/00; H04L 51/14; H04L 51/26; G06Q 10/10; G06Q 10/109
   See application file for complete search history.

(56) References Cited

U.S. PATENT DOCUMENTS

| | | | | |
|---|---|---|---|---|
| 2002/0071546 A1* | 6/2002 | Brennan | ........... | H04L 51/14 379/379 |
| 2003/0191806 A1* | 10/2003 | Osterberg, Jr. | ........ | G06Q 10/10 709/206 |
| 2006/0031356 A1* | 2/2006 | Drouet | ........... | G06Q 10/107 709/206 |
| 2007/0184855 A1* | 8/2007 | Klassen | ........... | G01S 5/0072 455/457 |
| 2011/0287741 A1* | 11/2011 | Prabhu | ........... | G06F 21/629 455/411 |
| 2012/0143964 A1 | 6/2012 | Deluca et al. | | |
| 2012/0260351 A1* | 10/2012 | Majeti | ........... | G06Q 10/107 726/28 |

(Continued)

OTHER PUBLICATIONS

Patent Cooperation Treaty Written Opinion of the International Searching Authority dated Dec. 4, 2015 issued for the parent application assigned International Application No. PCT/US2015/049096 with an International Filing Date of Sep. 5, 2015.

(Continued)

*Primary Examiner* — Padma Mundur
(74) *Attorney, Agent, or Firm* — Kal K Lambert; Lambert Patent Services, LLC

(57) ABSTRACT

Messages are sent to multiple addressees in an organization. Responses are correlated to the rank of the responding recipient in the organization, to assist the senders of messages to identify which responses to read. Receipt of the messages is acknowledged before the message can be fully read. Responses to the messages include a selection of a user status from a preset choice of statuses, and may include other response attributes required or offered by the sender of the message. The locations of responding and non-responding addressees of messages can be mapped.

21 Claims, 4 Drawing Sheets

| MESSAGES | | | | | | | | | | |
|---|---|---|---|---|---|---|---|---|---|---|
| MID | TITLE/MSG | ID | DATE | URGENT | ACK. | AV. | LOC. | ATT. | | ACT. |
| 44 | RIOTS | 17 | TIME1 | NO | YES | Y | Y | N | | V R |
| 43 | ACTIVATE | 17 | TIME2 | YES | YES | Y | Y | Y | | V R |
| 41 | TEST | 11 | TIME3 | NO | YES | N | N | Y | | V R |

| RESPONSES | | | | | | | | | | |
|---|---|---|---|---|---|---|---|---|---|---|
| RANK | NAME | ID | RESPONSE | RID | MID | LOCN. | ACK | AVAIL. | | ACT. |
| M.SRG. | TOLLEY | 15 | REQUEST | 204 | 44 | X1 Y1 | YES | YES | | V R |
| M.SRG. | TOLLEY | 15 | OK | 203 | 44 | | YES | YES | | V R |
| CORP. | HAHN | 31 | PROGRESS | 202 | 44 | X2 Y2 | YES | NO | | V R |
| M.SRG. | TOLLEY | 15 | GOOD TO | 201 | 43 | X4 Y4 | YES | YES | | V R |

| NON-RESPONSES | | | | | | | | | | |
|---|---|---|---|---|---|---|---|---|---|---|
| PRIV-1. | BURNS | 33 | | | 44 | | | | | V R |

(56) References Cited

U.S. PATENT DOCUMENTS

2013/0103450 A1* 4/2013 Lehmann ......... G06Q 10/06314
 705/7.19
2014/0215472 A1* 7/2014 Motahari Nezhad .......................
 G06Q 10/1097
 718/102

OTHER PUBLICATIONS

Patent Cooperation Treaty International Search Report dated Dec. 4, 2015 issued for the parent application assigned International Application No. PCT/US2015/049096 with an International Filing Date of Sep. 5, 2015.

* cited by examiner

| MESSAGES | | | | | | | | | | |
|---|---|---|---|---|---|---|---|---|---|---|
| MID | TITLE/MSG | ID | DATE | URGENT | ACK. | AV. | LOC. | ATT. | | ACT. |
| 44 | RIOTS | 17 | TIME1 | NO | YES | Y | Y | N | | V R |
| 43 | ACTIVATE | 17 | TIME2 | YES | YES | Y | Y | Y | | V R |
| 41 | TEST | 11 | TIME3 | NO | YES | N | N | Y | | V R |
| RESPONSES | | | | | | | | | | |
| RANK | NAME | ID | RESPONSE | RID | MID | LOCN. | ACK | AVAIL. | | ACT. |
| M.SRG. | TOLLEY | 15 | REQUEST | 204 | 44 | X1 Y1 | YES | YES | | V R |
| M.SRG. | TOLLEY | 15 | OK | 203 | 44 | | YES | YES | | V R |
| CORP. | HAHN | 31 | PROGRESS | 202 | 44 | X2 Y2 | YES | NO | | V R |
| M.SRG. | TOLLEY | 15 | GOOD TO | 201 | 43 | X4 Y4 | YES | YES | | V R |
| NON-RESPONSES | | | | | | | | | | |
| PRIV-1. | BURNS | 33 | | | 44 | | | | | V R |
FIG. 1
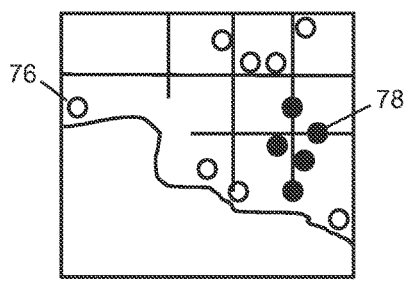
FIG. 2
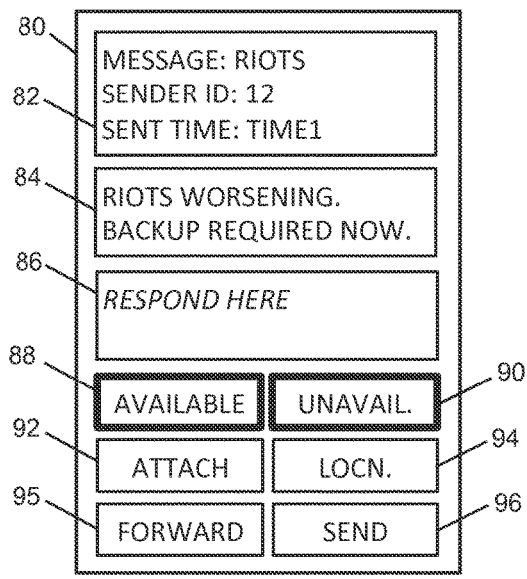
FIG. 3

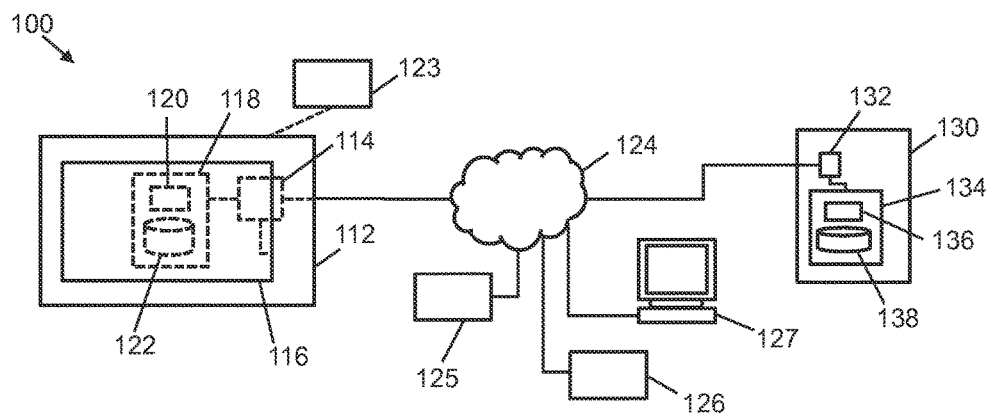
FIG. 4
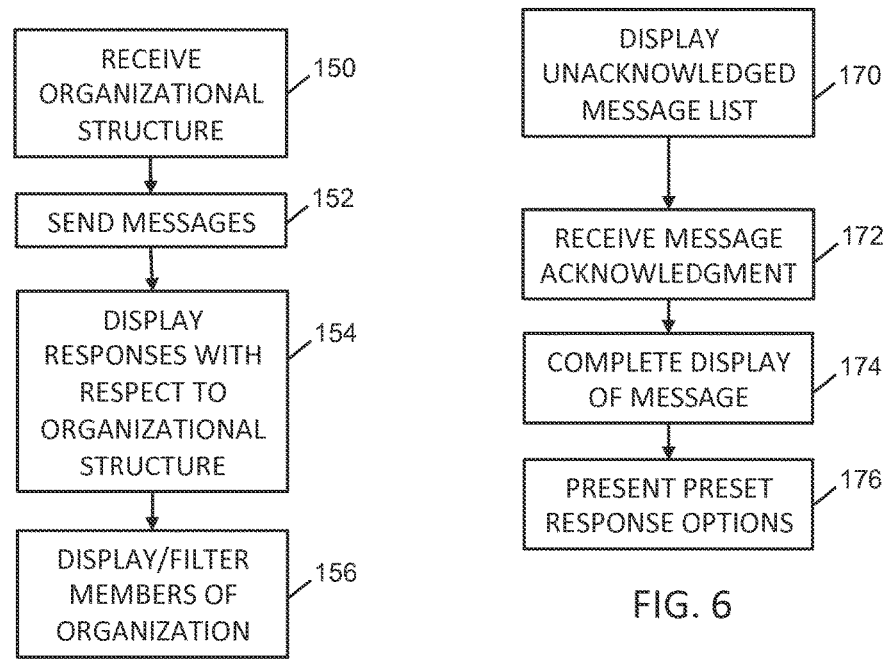
FIG. 5
FIG. 6

SYSTEM AND METHOD FOR MANAGING MESSAGES BASED ON USER RANK

TECHNICAL FIELD

This application relates to managing messages sent between multiple users. More specifically, messages are stored, managed and displayed to managers based on the hierarchy or organizational rank of the users who are sent the messages.

BACKGROUND

Reaching a large staff and providing clear bi-directional communication on extremely short timelines is difficult. Organizations generally rely on text and email to transmit information and generally rely on telephones for two-way communications. Coordination between management and workers in routine and emergency situations is often haphazard and unreliable. Coordination of multiple worker responses is slow and often misreported. Information that is known in the field cannot always be provided to management reliably. Coordination between companies and/or agencies does not exist because either the company or agency may not have a good visibility of their own situation. Current solutions usually rely on email, text, or phone trees. There is no method of providing feedback from the people in the field to relay the real world situation, other than emailing or texting images. There is no method for real-time estimation of forces available for whatever issue is at hand, especially for emergency issues that develop rapidly and would benefit from a speedy change in deployment of the forces in the field.

Current systems for management of personnel in the field rely on direct contact with management, based on 1950's phone tree concepts or administrative letters and responses. Traditionally, the focus is on getting the message out. Information flow is a push from management down, with limited or no flow back up the chain of command other than through formal lines of command. There is little bi-directional communication, which is a barrier to situational awareness.

This background information is provided to reveal information believed by the applicant to be of possible relevance to the present invention. No admission is necessarily intended, nor should be construed, that any of the preceding information constitutes prior art against the present invention.

SUMMARY OF INVENTION

The present invention is directed to a method and system for managing messages sent between multiple users based on the hierarchy or organizational rank of the users. Communication of messages can be to a group, individual, or both a group and individuals. Users must acknowledge receiving the message as part of their ability to view the messages, and a user's acknowledgment must be completed before the full message is displayed. Users who are sent messages from management may be obliged to select one of a limited number of user statuses before they can submit their response, such as a selection from "Available" and "Unavailable".

The system correlates all data and presents it in a layered, hierarchical format based on user position within an organizational structure, including summary data. By presenting messages hierarchically, managers can filter their view easily according to how far they want to look down the chain of command. The system can notify individuals or groups of issues, correlate responses, bring field data to management and generally improve situational awareness of a routine project or disaster response in a timely and efficient manner. The system may include tracking of worker locations and further data that is automatically sensed from the users' environments by connected sensors. Particular use for the system is found in situations in which a single leader is in charge of a time-sensitive project that involves a large number of personnel, from whom real-time or near real-time feedback would assist the leader in his decision making.

As disclosed herein, one aspect of the present invention is a method for managing electronic communications between users working in a hierarchical reporting structure comprising: receiving, by a processor, identifications of a plurality of users; receiving, by the processor, positions of each of said users in a hierarchical reporting structure; sending, by the processor, a message composed by one of the users ("sending user") to a plurality of addressees selected from a remainder of the plurality of users; receiving, by the processor, a plurality of responses to the message, the responses composed by at least some of the addressees ("responding users"), wherein at least two of the responding users have different positions in the hierarchical reporting structure; and displaying, on a device used by the sending user, a list comprising the responses ordered according to the positions of the responding users in the hierarchical reporting structure.

Further disclosed is a system for managing electronic communications between users working in a hierarchical reporting structure comprising: a processor; and a computer readable memory comprising computer readable instructions, which, when executed by the processor cause the processor to: receive identifications of a plurality of users; receive positions of each of said users in a hierarchical reporting structure; send a message composed on a device by one of the users ("sending user") to a plurality of addressees selected from a remainder of the plurality of users; receive a plurality of responses to the message, the responses composed by at least some of the addressees ("responding users"), wherein at least two of the responding users have different positions in the hierarchical reporting structure; and display, on a device used by the sending user, a list comprising: the responses ordered according to the positions of the responding users in the hierarchical reporting structure: and the position of each responding user in the hierarchical reporting structure.

Still further disclosed is a computer readable medium comprising computer readable instructions, which, when executed by a processor cause the processor to: receive identifications of a plurality of users; receive positions of each of said users in a hierarchical reporting structure; send a message composed on a device by one of the users ("sending user") to a plurality of addressees selected from a remainder of the plurality of users; require each addressee to acknowledge receipt of the message before fully displaying the message on a further device used by the corresponding addressee; receive an acknowledgment of receipt of the message from at least some of the addressees ("responding users"), wherein at least two of the responding users have different positions in the hierarchical reporting structure; display a preset number of options from which each responding user must make one selection; receive each responding user's selection; receive a response to the message from each responding user; and display, on the device, a list comprising: the responses ordered according to the positions of the responding user in the hierarchical reporting structure; the position of each responding user in the hierarchical reporting structure; and the selection of each responding user.

BRIEF DESCRIPTION OF DRAWINGS

The following drawings illustrate embodiments of the invention, which should not be construed as restricting the scope of the invention in any way.

FIG. 1 is a schematic diagram of a screen shot showing a list of messages sent and responses received, according to an exemplary embodiment of the present invention.

FIG. 2 is a map showing locations of users that have acknowledged receipt of a message and locations of other users that have not acknowledged receipt of the message.

FIG. 3 is a schematic diagram of a screen shot of a user's mobile device, showing a message received and options for response, according to an exemplary embodiment of the present invention.

FIG. 4 is a schematic diagram of a system for managing messages based on user hierarchy, according to an exemplary embodiment of the invention.

FIG. 5 is a flowchart showing steps taken by the system to display messages in a hierarchical format, in accordance with some implementations of the present invention.

FIG. 6 is a flowchart showing steps taken by the system to present preset options for reply, in accordance with some implementations of the present invention.

DESCRIPTION

A. Glossary

Figure 7:
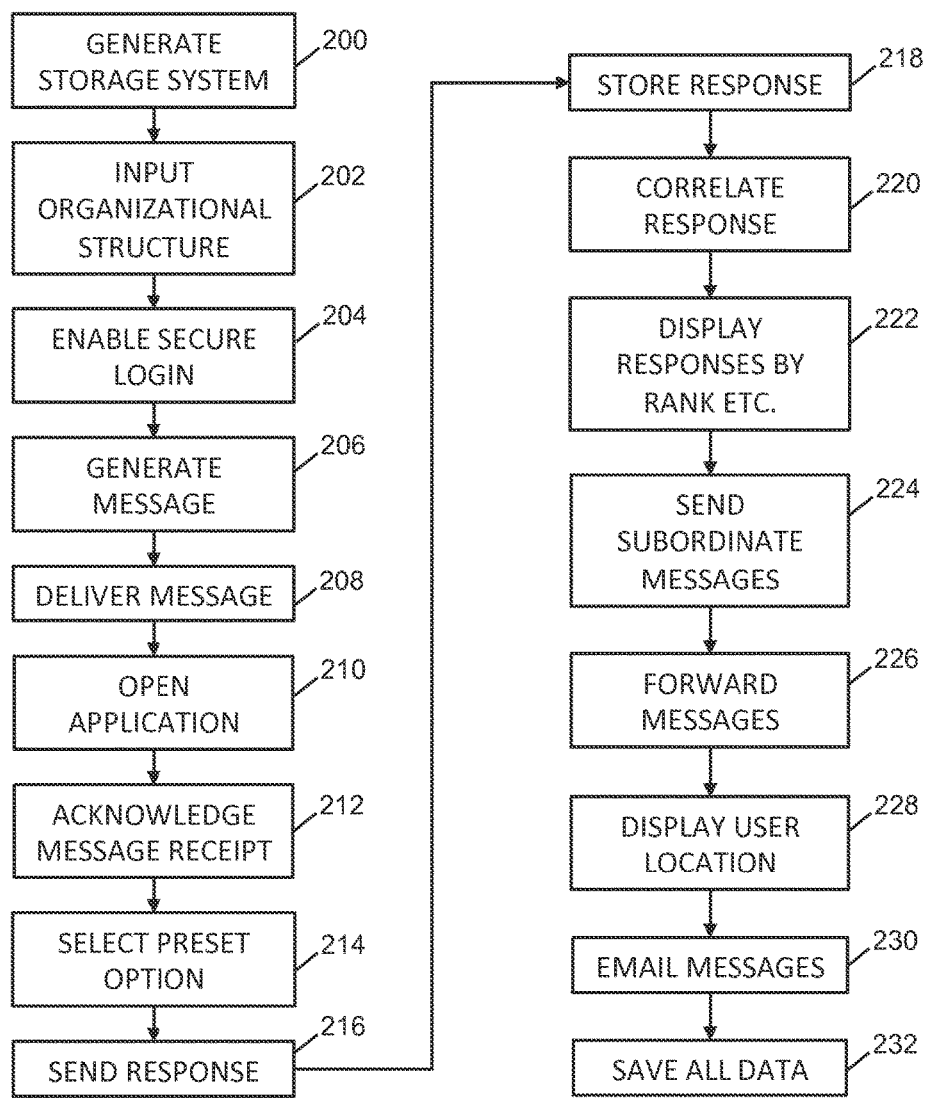
FIG. 7 is a flowchart showing steps taken by the system and its users, in accordance with some implementations of the present invention.

The term "firmware" includes, but is not limited to, program code and data used to control and manage the interactions between the various modules and/or components of the system.

The term "hardware" includes, but is not limited to, the physical housing for a computer as well as the display screen, connectors, wiring, circuit boards having processor and memory units, power supply, and other electrical components.

The term "manager" refers to a leader or user that has a higher rank than another user. In many cases, it refers to the person of highest rank that is using the system. A manager may be a civilian in charge of employees or other users of the system, or a member of the armed forces, for example.

The term "message" generally refers to the first communication in a thread of communications. Replies to a message are generally called responses. Note that subordinate messages may be initiated, or messages may be forwarded.

The term "module" can refer to any component in this invention and to any or all of the features of the invention without limitation. A module may be a software, firmware or hardware module, and may be located in a user device or a server.

The term "network" can include both a mobile network and data network without limiting the terms meaning, and includes the use of wireless (2G, 3G, 4G, WiFi, WiMAX™, Wireless USB (Universal Serial Bus), Zigbee™, Bluetooth™ and satellite), and/or hard wired connections such as internet, ADSL (Asymmetrical Digital Subscriber Line), DSL (Digital Subscriber Line), cable modem, T1, T3, fibre, dial-up modem, television cable, and may include connections to flash memory data cards and/or USB memory sticks where appropriate.

The term "processor" is used to refer to any electronic circuit or group of circuits that perform calculations, and may include, for example, single or multicore processors, multiple processors, an ASIC (Application Specific Integrated Circuit), and dedicated circuits implemented, for example, on a reconfigurable device such as an FPGA (Field Programmable Gate Array). The processor performs the steps in the flowcharts, whether they are explicitly described as being executed by the processor or whether the execution thereby is implicit due to the steps being described as performed by code or a module. The processor, if comprised of multiple processors, may have them located together or geographically separate from each other. The term includes virtual processors and machine instances as in cloud computing or local virtualization, which are ultimately grounded in physical processors.

The term "response attribute" refers to a feature that is to be part of each reply to a sent message. Such a feature may be optional or obligatory. For example, a response attribute may define that the respondent must include an indication of whether he is available or unavailable. Another example is whether an attachment can be added to the response, but at the discretion of the respondent.

The term "server" is used to refer to any computing device, or group of devices, that provide the functions described herein as being provided by one or more servers. If there are multiple constituent servers, they may be geographically co-located or separated.

The term "software" includes, but is not limited to, program code that performs the computations necessary for receiving user inputs, analyzing user inputs and providing outputs, the storage and organization of image related data, displaying information, etc.

The term "system" when used herein generally refers to a message management system based on user organizational hierarchy, the system being a subject of the present invention. If qualified, the term may also be applied to other systems.

The term "user" refers to a person who uses the system or interacts with it via a user device. There may be different types of user, such as a user who is a manager or a user who is employed by, managed by or is otherwise subordinate in hierarchy to the manager. In general, users are personnel on the field that receive direction from management.

B. Exemplary Embodiments

Referring to FIG. 1, a screenshot 10 is shown of a view that appears in a browser, for example, when the manager or user is connected to and using the exemplary organizational hierarchy message management system 100 (FIG. 4). The message area 12 lists the messages 13 that have been sent, with a summary of each message on one line. Each message has a message identification number (MID) 14, the messages shown having MIDs of 41, 43, and 44. Each message line shows the title 16 of the message, and optionally may include the text from the initial part of the message. Each line may be expanded so that the whole message is visible. Each message has an identification number (ID) 18 of the person who sent the message and a time and/or date 20 that the message was sent. A field 22 that indicates whether the message is urgent or not is displayed.

Various other fields may be present in the listing of the messages, such fields defining the properties of the messages. These are known as the response attributes. The acknowledgment field 24 indicates whether the message needs an acknowledgement or not, and the field can contain either a YES or a NO. The availability field 26 indicates whether the recipient should respond as to whether he is available or not for the task at hand, which is the subject of the message. If the availability field is set to YES (or Y), the addressees of the message must include an indication as to their availability before their response can be sent. This is achieved by requiring the addressee to click on a button that specifies his availability status. If the field is set to NO (or N) then the addressees of the message are not required to state their availability.

The location field 28 gives the option of the recipient to provide his location in response to the message. Again, the value of this field may be YES if it is required to be sent, or NO if it is not even to be provided to the addressees as an option. In some embodiments the field may be set to OPTIONAL, in which case the addressees may make their own decision as to whether of not to provide their locations. The attachment field 30 gives the recipient the ability to add an attachment to the response, and can either be a YES or a NO. The final field is the action field 34, which contains actions that the user or manager may take, such as viewing (V) the response or responses to the message or removing (R) it. Other actions may be included as required. Further fields 36 may be included depending on the embodiment, and may be customizable. Other values of the fields or response attributes may be used.

The lower part 50 of the screen 10 displays responses 51 to the messages 13. Each response is summarized on one line and has various fields associated with it. The response summary must show the rank 52 of the responding user within the hierarchy of the organization that is using the system. This allows the leader, or manager, to quickly identify the messages he wishes to read. For example, he may just want to read only the messages from the Master Sergeants. On another occasion, he may want a quick snapshot of what, specifically, is happening at a lower level of rank, such as at the Corporal or Private First Class levels. Without the system presently disclosed, this type of information would traditionally be difficult to obtain with such immediacy. The response summary list may be sorted by user rank. Alternately, all responses to a given message may be grouped together and then listed according to the rank of the sender. In some embodiments, the display of certain response summaries may be toggled on and off. For example, one or more of the ranks may be toggled on or off.

The other fields for the response summary listing include the name 54 of the respondent; the ID 56 of the respondent; the actual response itself 58 or the first few words of it, in which case it is expandable; a response identification number (RID) 60; and an MID 62, which corresponds to the MID 14 in the upper, message area 12, the response being a reply to the message with that MID. Also shown are response attributes of the response, including a location 64, which may be optional; an acknowledgment field 66, which indicates whether the addressee of the message has acknowledged receipt of it; and availability field 68, which indicates whether the recipient of the message has indicated his availability or unavailability. For each response summary line, there is an action field 70, which contains actions that the user or manager may take, such as viewing (V) the response or responses to the message or removing (R) it. There may also be other fields or response attributes, such as field 72. Such additional fields may be predefined, or may be customizable by the manager using the system. A given rank can be expanded or compressed to either display all responses from users of that particular rank, or to hide them.

The screen 10 may also show a summary list 74 of non-responses, i.e. a list of addressees that have not acknowledged receipt of the message. Optionally, these may be included in the list of responses 50 so that the complete picture of a response to a given question is located together on the screen.

Each leader can select to transmit a message to anyone in their chain of command, be it across one level or more. Each message is tagged by time and messages are tracked by group and/or individual addressee. The leader can see who has read the message, who has have accepted or rejected the request or direction in the message, and can see correlated responses from the users.

The information in the fields for each message and/or response may be expanded to provide further, more detailed underlying information. For example, the location field may link the user to another window or screen that displays the more detailed information, such as the location of the user on a map. If the message has been sent to multiple addressees, they may also be shown on the map.

Display of the screen in FIG. 1 may be refreshed from time to time, as the list may change as further responses are received.

In addition, the screen shot 10 in some embodiments is capable of displaying a complete list of the users in the organization. This list would therefore include not only the responders and non-responders to the messages, but would also include the users who were not even sent a message. The list may be a standalone list or it may be incorporated in a modified responses section 50, which would then show all users and whether each one has responded, not responded or has not been sent a particular message. This is important in providing a full picture to a leader, and may help a leader to decide, for example, whether and if it is possible to expand the addressee list of a message that has already been sent. The list may be filtered and displayed according to rank, or position in the hierarchical organizational structure, or by name, or by any other desired parameter that may be associated with each user. In situations where two or more organizations are working together on the same project, then the complete user list will include people from all the organizations. Where there are multiple organizations, the users, messages, responses and non-responses may be filtered and listed by organization, and/or by any other parameter that may be desired, including by rank or position of the user. This is especially important when multiple organizations come together to work on a disaster relief project.

Referring to FIG. 2, a map is shown with the locations 76 of users who have acknowledged receipt of a message. The locations reported may be the last known location of the users if the requirement to provide location is optional. Also shown on the map are the last known locations 78 of users who have not acknowledged receipt of the message. As it can be seen in this example, the group of users who have not acknowledged receipt are clustered together, which suggests that an abnormal situation may exist that requires further investigation. The locations mapped may be home locations. All non-acknowledged individuals who have been sent a message may be mapped using their home location to examine possible outage patterns. Depending on the technology employed, the locations of the users inside building may also be captured and monitored.

Referring to FIG. 3, a screen shot 80 is shown of a user's mobile device 112 (FIG. 4), such as a smart phone, which is, or is used as, part of the system 100. An upper region of the screen displays a header 82 for the message that has been received. The message has already been acknowledged to have been received by the user, even though the content of the message may not yet have been read by the user. The header region 82 may include more, or less, information than depicted, and it may be scrollable. Another region of the display 84 shows the actual content of the message. Short communications with direct actions, although not necessary, are best when using this system. Below this, there is a response area 86 in which the user can type a response to the message. Two buttons are shown that have a bold outline. These are the Available button 88 and the Unavailable button 90. In other embodiments they may be a different color to the other elements displayed on the screens, or they may be otherwise highlighted. In some embodiments, one of the buttons 88, 90 must be selected before the response is permitted to be entered.

Optionally, an Attach button 92 is displayed, which permits the user responding to the message to add a picture, video clip, voice recording or other media item or file to the message. The Attach button 92 may be grayed out until the user is permitted to make an attachment, which in some embodiments may be after the user has selected either the Available button 88 or the Unavailable button 90. In some embodiments the Attach button 92 may not even be displayed, for example if it is not required to be a response attribute by the sender of the message. Responses with or without attachments can be sent even if the Unavailable button 90 is selected.

Optionally, a Location button 94 is displayed, which permits the user responding to the message to add his location to the message. The user's location may be determined by a global positioning system, for example, which may include use of a sensor internal or external to the user's mobile device. The Location button 94 may be grayed out until the user is permitted to add his location, which in some embodiments may be after the user has selected either the Available button 88 or the Unavailable button 90. In some embodiments the Location button 94 may not even be displayed, either because a location of the user is not required or because it is compulsory and therefore automatically supplied by the system.

Optionally, a Forward button 95 is displayed, which permits the user responding to the message to forward the message to another individual, group or both an individual and group. The Forward button 95 may be grayed out until the user is permitted to forward the message, which in some embodiments is after the user has selected either the Available button 88 or the Unavailable button 90. The Send button 96 allows the user to send the response, which is only possible after the user has specified his availability, by selecting either the Available button 88 or the Unavailable button 90.

In this embodiment, one of Available button 88 or the Unavailable button 90 must be selected prior to the send button 96 being activated by the user. In other embodiments, the response to the message may be solely the selection of one of the buttons 88, 90, in which case the response field 86, Attach button 92, Location button 94, Forward button 95 and the Send button 96 would not be required. Other configurations of the system are possible, such as providing the addressees of the messages a different choice of buttons from which an obligatory selection must be made before a response can be sent. For example, a different, limited or predefined number of buttons such as three, or more, may be displayed on the user's mobile device, with each button representing a different status of the user with respect to the message.

Responses are tagged with the time and date. Multiple responses can be generated to provide data or to change the responder's status, so only the last response from a user is used for totaling metrics. All responses are tied into a database for use by management. The latest response from a user is considered to be the active response regarding whether the user is available to perform the task requested in the message.

Referring to FIG. 4, an exemplary organizational hierarchy message management system 100 is shown. The system 100 includes or interacts with a portable user computing device 112, which may be a smartphone, a tablet, a laptop, electronic goggles, a wrist device, other wearable devices, a thin client or any other electronic device that provides the necessary equivalent functionality to fulfill the requirements of the invention. The user device 112 includes one or more processors 114 and a display screen 116, operably connected to the processor(s), which are also operably connected to computer readable memory 118 included in the device. The display screen may be a traditional screen, a touch screen, a projector, an electronic ink display or any other technological device for displaying information. The system 100 includes computer readable instructions 120 (e.g. a mobile device application) stored in the memory 118 and computer readable data 122, also stored in the memory. The memory 118 may be divided into one or more constituent memories, of the same or different types.

A sensor 123 may be connected by wire or wirelessly to the user device 112, such as by short range radio communications. Such as sensor 123 may be, for example, a speech recognition system, an eye-tracking system, a geo-locating system, an infra red detector, an infra red camera, a chemical sensor, a temperature sensor, a head-mounted video camera, a smoke detector or another detector that senses an aspect of the environment of the user using the user device 112. The interface of a sensor 123 to the system 100 also allows users to collect and transmit their observations and information from the field. Observations are correlated by original message (i.e. task) for presentation to the leaders.

The user device 112 is connected to or into the system via a network 124, which may, for example, be the internet, a telecommunications network, a local area network, a bespoke network or any combination of the foregoing. Communications paths in the network 124 may include any type of point-to-point or broadcast system or systems. Other users may have further user devices 125, 126 with functionally equivalent components to those of device 112, which may also be part of, or connected to, the system. The system 100 may also include one or more non-portable computing terminals, such as a desktop 127 or other similar device, which as known has one or more processors and computer readable instructions and data stored in computer readable memory.

The system 100 also includes a server 130, which has one or more processors 132 operably connected to a computer readable memory 134, which stores computer readable instructions 136 and computer readable data 138. Data 138 may be stored in a relational database, for example. The computer readable instructions 120, 136 and computer readable data 122, 138 provide the functionality of the system 100 when executed or read by the processors 114, 132.

FIG. 5 shows a flowchart of the main steps in a process that is related to FIG. 1. In step 150, the system 100 receives the organizational structure of the users that are going to use the system. This may occur, for example, by an administrator for the organization inputting the structure via desktop 127. The structure inputted includes the rank of each user, either expressed as a rank or other job description, and, if necessary, includes the hierarchy of the ranks or other job descriptions. In step 152, managers, for example, create and send messages to one or more other subordinate users of the system 100. In step 154, the responses to the messages are displayed on a manager's desktop, the display being with respect to the organizational structure that was previously input in step 150. The display may be presented, for example as in the display of FIG. 1.

In step 156, the complete set of members of the organization structure may be displayed, either as a standalone list or in relation to whether the members have been sent a message, responded to a message, not responded to a message, and/or have not been sent a message.

Where there are multiple organizations working together on the same project, all the organization structures would be input in step 150, and responses from members of all the organizations will be displayed in step 154. In step 156, the system allows for the display of all of the users, i.e. members of all the organizations. This is a list that may be filtered by any desired parameter that is attached to the members.

FIG. 6 shows a flowchart of the main steps of a process that the system 100 performs in relation to FIG. 3. In step 170, the system 100 causes the display on the user's mobile device 112 of a summary or list of at least one unacknowledged message. It may be displayed as part of a summary list of several messages, some of which have been acknowledged and others which have not been acknowledged. The user must acknowledge receipt of the message before reading it fully, which is implemented by the system requiring an acknowledgment before the whole of the message is displayed on the user's mobile device 112. It may be the case that at least part of the header of the message is displayed, and/or a portion of the message title, and/or a portion of the message content, prior to receiving an acknowledgment from the recipient. In step 172, the system receives the acknowledgment of receipt of the message, via an input from the user at the user's mobile device 112. After the acknowledgment has been received, which may be determined by a module in the user's mobile device 112 or the server 130, then the mobile device displays, in step 174, the complete content of the message, or otherwise allows the complete message to be viewed by scrolling. This is the display that corresponds to FIG. 3. Also part of this display is, as in step 176, the presentation of preset options from which the user must make a selection before a response to the message can be sent.

FIG. 7 shows a flowchart representing the set-up and use of the system 100. In step 200, the data storage system 138 is generated or otherwise set up such that it can accommodate all the messages, responses and attachments etc. that are expected. In step 202, the organizational structure is input into the data 138 of the database, including identifications of the personnel, using an API (application program interface), for example. Each organization has a single, leading user that can have any number of subordinates and/or subordinate levels. Each other user can have any number of subordinate levels and subordinate users, but only one superior. User ranks are not unique, but user identification is. Multiple users can have the same rank. In step 204, a secure login protocol is enabled that permits the personnel previously inputted to login securely. Secure login may be achieved by tying login attempts to another user identification system used by the organization or to another, private or third party identification system.

In step 206, a manager using the system 100 generates a group or individual message that is to be sent to one or more of the personnel who have been registered in the system in step 202. Groups and/or users can be added and/or deselected from the distribution list. The message is generated in free text format. The manager selects the desired response attributes 26, 28, 30 to be returned with acknowledgment 24 and/or response. All messages go into the data 138 in the database of memory 134 with a unique MID 14. For each message, the MID is stored along with the actual message, the sender name, recipient names, all responses, response attributes and identifications of all respondents.

In step 208, the system delivers the message and/or notification of the message to the mobile devices of the intended recipients. Multiple delivery paths may be used as necessary, such as email, pager, automated phone call or text message, which contains a link that opens the mobile device application 120. This is useful for urgent messages. For example, the user may receive a text to let him know that there is an immediate need for him to log into the application. The system 100 tracks delivery of the message and records that it has been sent into the data 138, together with the addressees of the message.

In step 210, the user receiving the notification opens the application, or brings it to the foreground if already open.

Once in the application, the user must acknowledge receipt of the message in step 212. The application itself may generate a notification that a new message has been received. Opening the application will cause the display of a list of urgent and normal messages. Also, unacknowledged messages are identified.

In some embodiments, the action of opening the application may automatically generate the acknowledgment of receipt of the message. This provides a record of irrefutable receipt of the message.

In step 214, users select from several obligatory variables such as Available and Unavailable, and may also select other options such as providing location, text, pictures, audio and video. In some embodiments, the user may be prevented from closing the application if an obligatory selection has not been made. In step 216, the user sends the response. Only users specifically sent a message can respond to it.

In step 218, users' responses are copied to server storage 138 and, in step 220, the responses are correlated with other responses to the same message. Stored responses are traceable against MID 14, sender ID 18, respondent ID 56, etc.

In step 222, the messages and responses are displayed by rank, for example on a desktop computer 127. Managers can view the responses filtered or sorted by person, group, organization, etc. The system 100 automatically tallies the number of messages sent, the number of messages acknowledged, the number of positive responses, the number of negative response, the attachments, etc. Managers can see the existence of the messages and the staff responses only if their staff were part of the recipient pool.

In step 224, new or subordinate messages can be sent from any level of management both up and down the management chain. Follow-on and subordinate messages, or messages flowed down the chain of command are allowed. For example, the senior manager can send messages to junior managers, who can then forward messages to individuals, and all the messages will be related together in the database 138. All managers have access to the system as a user and as a manager. As users get messages, they can forward them in step 226, using the Forward button as shown in FIG. 3.

In step 228, the user location can be fused into the window that displays the messages and responses. From a smart phone or web browser, responses to messages can be tagged with user locations and transmitted when the responses are sent in step 216. All user locations can be seen on a map or as coordinates. Tracking of user location can be turned off if desired by the agency running the system 100.

In step 230, users can be emailed with direct information regarding messages. The information includes the message number, which is automatically inserted. A direct response to users via email is possible when distribution using secondary messages is inappropriate. User emails are linked to the user ID 18, 56 and to the MID 14, 62.

In step 232, all data is saved, including updates for later analysis and trending.

Figure 8:
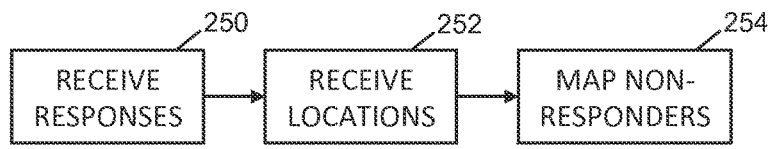
FIG. 8 is a flowchart showing steps taken by the system to map non-responders, in accordance with some implementations of the present invention.

FIG. 8 shows a process the system 100 performs in relation to FIG. 2. In step 250, the system receives responses from the users. In step 252 the system receives locations of the respondents of the messages. In step 254, the non-responders' home locations or last known locations are mapped to look for possible impact zones in disaster situations. For example, the location of a cluster of non-responders might suggest a breakdown in the communication system in that area.

Figure 9:
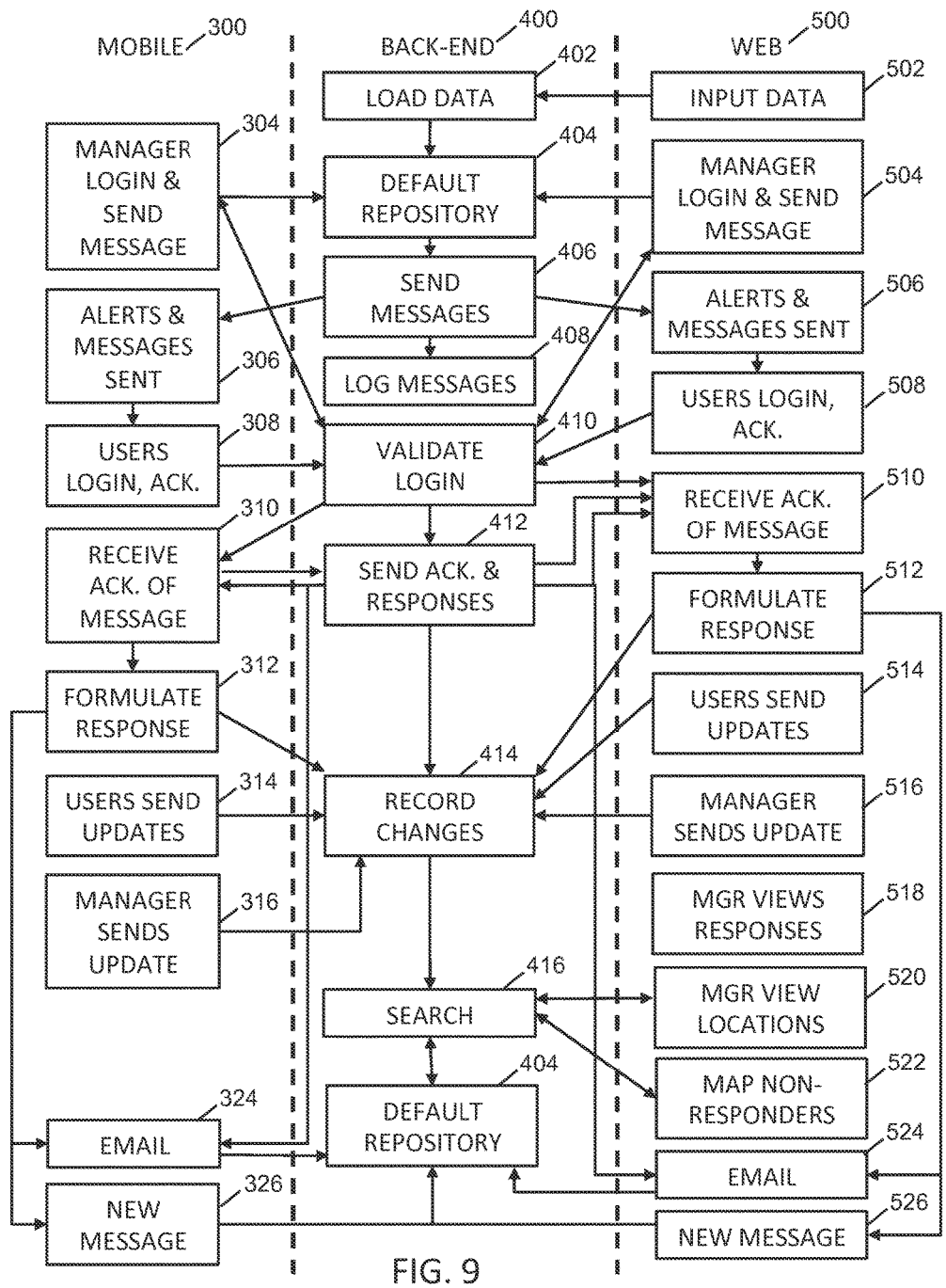
FIG. 9 is a schematic representation of various modules and their interaction, in accordance with some implementations of the present invention.

FIG. 9 shows some of the modules of the system 100 and their interactions with each other. The modules are divided into modules 300 on mobile devices 112, modules 400 on a back-end processor, such as server 130, and modules 500 on a web based server that provides an interface to users on a device such as a desk top computer 127. Interconnecting lines, which are shown as crossed, do not connect to each other. Note that some of the connections, which can obviously be inferred, are not shown for clarity. Managers and users can use both of the web interface and the mobile device modules.

In this embodiment, input data, including existing data and/or organizational structure is input to the system via a data input module 502. This data is loaded into the back-end using module 402. The input data is then stored in a default repository 404 (shown twice on the figure for clarity). This repository is for messages, responses, attachments, etc. Modules 304 and 504 are used to permit managers to log in and send messages. Details of the logins and the messages are stored in the repository 404. The messages are then sent by module 406, together with any urgent notifications if required, to the users' devices. Notifications and messages are received by modules 306 and 506. The sending of the messages is logged to the corresponding users' names, including whether urgent notifications are transmitted with the messages, by module 408.

In response to receiving message notifications, users, who are the addressees of the messages login to the system via modules 308 and 508. The back-end module 410 validates the users' logins and sends the messages and/or attributes of the messages to the user devices, if they have not already been sent. In modules 310 and 510, the system receives message acknowledgments from the users. In response, the back-end module 412 sends the acknowledgments to the managers, and to a module 414 that records the changes in the repository 404.

After the recipients of the messages have logged in and acknowledged receipt of messages, they formulate a response via modules 312 and 512. Responses that are formulated, appended with attachments and sent are recorded by module 414. Users may send further responses, i.e. updates, using modules 314 and 514, which send the changes to module 414 for recording in the repository 404. Managers may send further responses, i.e. updates, using modules 316 and 516, which send the changes to module 414 for recording in the repository 404.

Managers may view the responses using module 518, and view the locations of the users with module 520. The locations of non-responders can be observed using module 522. Search module 416, connected to the repository can be used to assist with modules 520 and 522. The search module 416 can of course be used to search any of the data stored in the repository 404.

As part of formulating a response, follow on emails can be sent using modules 324 and 524, and new messages can be developed and sent using modules 326 and 526.

C. Industrial Applicability

The system provides a real-time, reliable, bi-directional communication of messages, responses and reports with real-time situational awareness for personnel in an organization. It correlates all data and presents in a layered hierarchy based on users' positions in the organization. It can produce summary reports, situational reports, email chains, map displays, etc., either for routine tracking of projects or for disaster response operations, for example.

D. Variations

The present embodiments include the best presently contemplated mode of carrying out the subject matter disclosed and claimed herein. However, variations are possible. Modules and/or components described as being in a specific location may be implemented in another location. For example, one or more of the modules may be present in the server, the mobile device and/or the web-based browser. Where modules have been shown separately, two or more of them may be combined into one, depending on the embodiment chosen. In other embodiments, modules may be divided into constituent modules. Additional modules may be added without departing from the scope of the claimed invention. One or modules may be omitted, again without departing from the scope of the claimed invention.

The format of the displays shown herein may be varied provided that the necessary functionality of the system is retained. For example, the relative positioning of displayed elements may be changed without affecting the invention. Whether a displayed element has a particular color, is highlighted or emboldened can be chosen or changed as desired. Specific words used in the displays may be different. Multiple views of the data and multiple methods for parsing the data can be used, based on manager preferences and organizational needs. The system may permit customization of the message delivery and response process and may support multiple organizational constructs. While the summarization of results is currently tabular, it could alternately include graphical presentation styles.

As well as interfacing with emails, the system may also be configured to permit follow-on phone calls to any user in the system.

The system 100 may be configured to operate for multiple, related or unrelated organizations, in which case organization identity within the system is unique. Different organizations may have ranks in common or even the same hierarchy of positions. Different organizations may work together on the same project or disaster response.

Full multi-media capabilities may be included.

In general, unless otherwise indicated, singular elements may be in the plural and vice versa with no loss of generality. The use of the masculine can refer to masculine, feminine or both.

Throughout the description, specific details have been set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The detailed description has been presented partly in terms of methods or processes, symbolic representations of operations, functionalities and features of the invention. These method descriptions and representations are the means used by those skilled in the art to most effectively convey the substance of their work to others skilled in the art. A software implemented method or process is here, and generally, understood to be a self-consistent sequence of steps leading to a desired result. These steps require physical manipulations of physical quantities. Often, but not necessarily, these quantities take the form of electrical or magnetic signals or values capable of being stored, transferred, combined, compared, and otherwise manipulated. It will be further appreciated that the line between hardware and software is not always sharp, it being understood by those skilled in the art that the software implemented processes described herein may be embodied in hardware, firmware, software, or any combination thereof. Such processes may be controlled by coded instructions such as microcode and/or by stored programming instructions in one or more tangible or non-transient media readable by a computer or processor. The code modules may be stored in any computer storage system or device, such as hard disk drives, optical drives, solid-state memories, etc. The methods may alternatively be embodied partly or wholly in specialized computer hardware, such as ASIC or FPGA circuitry.

It will be clear to one having skill in the art that variations to the specific details disclosed herein can be made, resulting in other embodiments that are within the scope of the invention disclosed. Unless explicitly required, steps in the flowcharts may be performed in a different order, other steps may be added, or one or more may be removed without altering the main function of the system. Flowcharts from different figures may be combined in different ways. Screen shots may show more or less than the examples given herein. All parameters and configurations described herein are examples only and actual values of such depend on the specific embodiment. Accordingly, the scope of the invention is to be construed in accordance with the substance defined by the following claims.

The invention claimed is:

1. A method for managing electronic communications in a hierarchically ordered organization, which comprises:
   providing an application for managing electronic communications, the application comprising one or more program modules, each module having a processor-executable instruction set
   installing at least one of the program modules in each of a plurality of computing devices having each a processor and a non-transitory memory for storing and executing the instruction set, and distributing the plurality of devices to a plurality of users;
   by the plurality of computing devices, associating each user and each device with a user identification and an organizational rank or position in a hierarchical reporting structure, the structure defining multiple levels including at least one manager and multiple subordinates;
   by a first device, sending a message related to a task at hand to a list of addressees in the hierarchical reporting structure, the message having a message identifier;
   by the first device, receiving responses from one or more responding users and displaying a summary sortable according to one or more response attributes associated with each responding user, the response attributes comprising a field that acknowledges the message, a user identifier field, a message identifier field referencing the task at hand, a status field as available or unavailable, a position or rank field, and an action field, wherein the one or more response attribute fields are populated with a value from the received responses; and,
   further characterized in that the summary includes a location attribute for each responding user, the location information is acquired from each responding user, and is displayed on a map on the first device.

2. The method of claim 1, comprising, by the first device, displaying a summary of response attributes and the associated values of each responding user, wherein the summary is sorted according to a selection of status as available or unavailable for the task at hand.

3. The method of claim 1, comprising displaying, on the first device, a summary of response attributes and the associated values of the non-responding users.

4. The method of claim 3, comprising displaying a summary of response attributes and associated values of the responding users, the non-responding users, or a combination of both the responding users and the non-responding users.

5. The method of claim 3, comprising:
   receiving location information for the non-responding users; and displaying the locations on a map.

6. The method of claim 1, comprising, requiring an addressee to acknowledge receipt of the message before fully displaying the message.

7. The method of claim 1, comprising, displaying, on a device associated with each addressee, a preset number of fields for which each responding user must select a value; and receiving, on the first device, the selections of each responding user.

8. The method of claim 1, wherein, on the first device, the receiving of a response from a user is disabled until the user has made the selection of available or not available for the task at hand.

9. The method of claim 8, wherein, by the first device, the response from each user is distinguishably displayed with a selection of status as being available or unavailable for the task at hand.

10. The method of claim 1, further comprising by the first device, receiving location information for the non-responding users; and distinguishably displaying the locations of the responding and the non-responding users on a map.

11. The method of claim 1, comprising, by the first device, receiving data from a sensor associated with a device operated by a responding user.

12. The method of claim 1, comprising:
   a) adding or removing users to or from the list of addressees;
   b) sending or replying to follow-on and subordinate messages up and down the levels of the hierarchical reporting structure;

c) forwarding a message from a junior management user to a subordinate or subordinates;
d) compiling and displaying messages, updates, and responses from junior management and subordinates at any level of the hierarchical reporting structure;
e) making direct responses between any two users within the hierarchical reporting structure and incorporating the direct responses into a database;
f) providing a search module to filter responses; or,
g) automatically capturing sensor data from users.

13. A non-transitory computer-readable medium holding program instructions, which when installed in and executed by a processor of a first computing device, cause the first computing device to perform the operations of:
receive identifications of a plurality of subordinate users, each subordinate user having an associated computing device;
associate each subordinate user and each associated device with a user identification and an organizational rank or position in a hierarchical reporting structure;
send a message related to a task at hand to a selection of addressees in the hierarchical reporting structure, the message having a message identifier;
receive responses ("received responses ")from one or more of the selection of addressees ("responding users ")and display a summary sortable according to one or more response attributes associated with each responding user, the response attributes comprising a field that acknowledges the message, a user identifier field, a message identifier field referencing the task at hand, a status field as available or unavailable, a position or rank field, and an action field, wherein the one or more response attribute fields are enabled to be populated with a value from the received responses; and,
further characterized in that the summary includes a location attribute for each responding user, the location information is acquired from each responding user, and is displayed on a map on the first device.

14. The computer-readable medium of claim 13, wherein the program instructions, when executed, cause the first device to display a summary of response attributes and associated values of each responding user, wherein the summary is sorted according to a selection of status as available or unavailable for the task at hand.

15. The computer-readable medium of claim 13, wherein the program instructions, when executed, cause the first device to display a summary of response attributes and associated values of the non-responding users.

16. The method of claim 7, further comprising preventing a screen on a respondent device from closing until the corresponding responding user has made a selection of status as either available or unavailable for the task at hand.

17. The computer-readable medium of claim 13, wherein the program instructions, when executed, cause the first device to display a summary of response attributes and associated values of the responding users, the non-responding users, or a combination of both the responding users and the non-responding users.

18. The compute-readable medium of claim 13, wherein the program instructions, when executed, cause the first device to receive location information for the non-responding users; and display the locations on the map.

19. The computer-readable medium of claim 18, wherein the program instructions, when executed, cause the first device to distinguishably display the locations of responding and non-responding users on a map.

20. The computer-readable medium of claim 13, wherein the program instructions, when executed, cause the first device to distinguishably display the responses according to a selection of status of the responding users as being available or unavailable for the task at hand.

21. The computer-readable medium of claim 13, wherein the program instructions, when executed, cause the first device to receive data from a sensor associated with a device operated by a responding user.

* * * * *